(12) United States Patent
Dooley

(10) Patent No.: US 9,840,571 B2
(45) Date of Patent: Dec. 12, 2017

(54) INERT STRIPPING OF VOLATILE ORGANIC COMPOUNDS FROM POLYMER MELTS

(71) Applicant: Chevron Phillips Chemical Company LP, The Woodlands, TX (US)

(72) Inventor: Kenneth A. Dooley, Porter, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 35 days.

(21) Appl. No.: 15/015,737

(22) Filed: Feb. 4, 2016

(65) Prior Publication Data

US 2017/0226240 A1    Aug. 10, 2017

(51) Int. Cl.
  *C08G 63/02*    (2006.01)
  *C08F 110/02*   (2006.01)

(52) U.S. Cl.
  CPC ................... *C08F 110/02* (2013.01)

(58) Field of Classification Search
  CPC ...................................... C08F 6/005
  USPC .................................. 528/480, 499
  See application file for complete search history.

(56) References Cited

U.S. PATENT DOCUMENTS

| | | |
|---|---|---|
| 3,248,179 A | 4/1966 | Norwood |
| 3,683,511 A | 8/1972 | Johnson et al. |
| 3,917,507 A | 11/1975 | Skidmore |
| 4,501,885 A | 2/1985 | Sherk et al. |
| 4,588,790 A | 5/1986 | Jenkins, III et al. |
| 5,352,749 A | 10/1994 | DeChellis et al. |
| 5,436,304 A | 7/1995 | Griffin et al. |
| 5,565,175 A | 10/1996 | Hottovy et al. |
| 5,575,979 A | 11/1996 | Hanson |
| 6,239,235 B1 | 5/2001 | Hottovy et al. |
| 6,262,191 B1 | 7/2001 | Hottovy et al. |
| 6,410,683 B1 * | 6/2002 | Craig ............... C08F 6/005 528/480 |
| 6,833,415 B2 | 12/2004 | Kendrick et al. |
| 7,163,906 B2 | 1/2007 | McDaniel et al. |
| 7,619,047 B2 | 11/2009 | Yang et al. |
| 7,790,820 B2 | 9/2010 | Jensen et al. |
| 7,942,955 B2 | 5/2011 | Streiff |
| 7,960,487 B2 | 6/2011 | Yang et al. |
| 8,138,113 B2 | 3/2012 | Yang et al. |
| 8,207,280 B2 | 6/2012 | Murray et al. |
| 8,268,944 B2 | 9/2012 | Yang et al. |
| 8,450,436 B2 | 5/2013 | Masino et al. |
| 9,181,372 B2 | 11/2015 | Yang et al. |

FOREIGN PATENT DOCUMENTS

| | | |
|---|---|---|
| EP | 0369708 A1 | 5/1990 |
| EP | 1084739 A2 | 3/2001 |
| EP | 2772290 A1 | 9/2014 |

OTHER PUBLICATIONS

Biesenberger, J. A., et al., "Devolatilization of Polymer Melts in Single-Screw Extruders," Polymer Engineering and Science, Sep. 1982, pp. 832-835, vol. 22, No. 13.
McNaught, Alan D., et al., "Compendium of Chemical Terminology," IUPAC Recommendations, Second edition, 1997, 5 pages, Wiley-Blackwell.
Pfeiffer, Armin, "Melt Devolatilization with Single Screw Extruders," 10th LDPE Plant Improvement Conference, May 18-20, 2015, 14 pages.

* cited by examiner

*Primary Examiner* — Terressa Boykin
(74) *Attorney, Agent, or Firm* — Conley Rose, P.C.; Rodney B. Carroll; Monte R. Rhodes

(57) ABSTRACT

A method of removing VOCs from a molten polymer comprising: (a) polymerizing monomers in a reactor to produce a reaction mixture comprising unreacted monomers and molten polymer, (b) removing a portion of unreacted monomers from at least a portion of the reaction mixture to produce recovered monomers and degassed molten polymer, wherein the degassed molten polymer comprises VOCs, (c) contacting at least a portion of the degassed molten polymer with an inert stripping agent at a pressure equal to or greater than atmospheric pressure to produce stripped molten polymer and spent stripping agent, wherein the inert stripping agent is insoluble in the degassed molten polymer, and wherein the spent stripping agent comprises at least a portion of the inert stripping agent and at least a portion of the VOCs from the degassed molten polymer, and (d) cooling at least a portion of the stripped molten polymer and forming polymer pellets.

21 Claims, No Drawings

INERT STRIPPING OF VOLATILE ORGANIC COMPOUNDS FROM POLYMER MELTS

TECHNICAL FIELD

The present disclosure generally relates to the production of polyethylene. More specifically, this disclosure relates to a method for removing volatile organic compounds from polyethylene.

BACKGROUND

Polymers, such as polyolefins, are plastic materials useful for making a wide variety of valued products due to their combination of stiffness, ductility, barrier properties, temperature resistance, optical properties, availability, and low cost. In particular, polyethylene is one of the largest volume polymers consumed in the world.

The production of polymers such as polyethylene may result in a polymer product with an undesirable content of volatile organic compounds (VOCs), mostly unreacted monomers, solvents, dimers, trimers, and other oligomers. VOCs in polymer products can impart unwanted properties to the polymer, such as unpleasant odor and flammability. Some approaches to removing VOCs from molten polymers involve the use of vacuum and elevated temperatures, which requires perfect sealing to prevent air intrusion, as air can be detrimental to polymer properties and it could accumulate to form a flammable atmosphere. Other approaches to removing VOCs from polymers involve degassing a solid polymer in large silos over extended time periods, thereby requiring additional equipment and delaying the use of the polymer. Thus, there is an ongoing need for developing methods for the removal of VOCs from polymers.

BRIEF SUMMARY

Disclosed herein is a method of removing volatile organic compounds (VOCs) from a molten polymer comprising (a) polymerizing monomers in a reactor to produce a reaction mixture comprising unreacted monomers and the molten polymer, (b) removing a portion of the unreacted monomers from at least a portion of the reaction mixture to produce recovered monomers and a degassed molten polymer, wherein the degassed molten polymer comprises VOCs, (c) contacting at least a portion of the degassed molten polymer with an inert stripping agent at a pressure equal to or greater than about atmospheric pressure to produce a stripped molten polymer and a spent stripping agent, wherein the inert stripping agent is insoluble in the degassed molten polymer, and wherein the spent stripping agent comprises at least a portion of the inert stripping agent and at least a portion of the VOCs from the degassed molten polymer, and (d) cooling at least a portion of the stripped molten polymer and forming polymer pellets.

Further disclosed herein is a method of removing volatile organic compounds (VOCs) from a molten polymer comprising (a) polymerizing ethylene in a high-pressure autoclave or tubular reactor to produce a reaction mixture comprising unreacted ethylene and a molten low density polyethylene (LDPE), (b) removing a portion of the unreacted ethylene from at least a portion of the reaction mixture to produce first recovered ethylene and a degassed molten LDPE, wherein the degassed molten LDPE comprises VOCs in an amount of from about 500 parts per million weight (ppmw) to about 2,000 ppmw, based on the total weight of the degassed molten LDPE, wherein the degassed molten LDPE is characterized by a degassed molten LDPE temperature of from about 240° C. to about 350° C., wherein the degassed molten LDPE is characterized by a degassed molten LDPE Melt Index (MI) of from about 0.1 dg/min to about 500 dg/min, wherein MI is an LDPE melt index under a force of 2.16 kg as determined in accordance with ASTM D1238-13 or ISO 1133-2012, and wherein at least a portion of the first recovered ethylene is recycled to step (a) of polymerizing ethylene, (c) contacting at least a portion of the degassed molten LDPE with an inert stripping agent in an extruder at a pressure of from about 1 atm (101.3 KPa) to about 2 atm (202.7 KPa) to produce a stripped molten LDPE and a spent stripping agent, wherein the spent stripping agent comprises at least a portion of the inert stripping agent and at least a portion of the VOCs from the degassed molten LDPE, and wherein the stripped molten LDPE is characterized by a VOC content of from about 1 ppmw to about 100 ppmw, based on the total weight of the stripped molten LDPE, (d) cooling at least a portion of the stripped molten LDPE exiting the extruder and forming LDPE pellets, and (e) optionally contacting at least a portion of the LDPE pellets with an inert gas characterized by an inert gas flow rate, wherein a flow rate of the inert gas is from about 50% to about 99% lower than a flow rate of an inert gas contacted with LDPE pellets produced by an otherwise similar method lacking a step of contacting the degassed molten LDPE with an inert stripping agent at a pressure of from about 1 atm (101.3 KPa) to about 2 atm (202.7 KPa).

Also disclosed herein is a method of removing volatile organic compounds (VOCs) from a solid polymer comprising (a) melting the solid polymer to yield a molten polymer, wherein the molten polymer comprises VOCs, (b) contacting at least a portion of the molten polymer with an inert stripping agent at a pressure equal to or greater than about atmospheric pressure to produce a stripped molten polymer and a spent stripping agent, wherein the inert stripping agent is insoluble in the molten polymer, and wherein the spent stripping agent comprises at least a portion of the inert stripping agent and at least a portion of the VOCs from the molten polymer, and (c) cooling at least a portion of the stripped molten polymer and forming polymer pellets.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

Disclosed herein are methods for removing volatile organic compounds (VOCs) from polymers. In an embodiment, a method of removing VOCs from a molten polymer can generally comprise the steps of (a) polymerizing monomers in a reactor to produce a reaction mixture comprising unreacted monomers and the molten polymer; (b) removing a portion of the unreacted monomers from at least a portion of the reaction mixture to produce recovered monomers and a degassed molten polymer, wherein the degassed molten polymer comprises VOCs; (c) contacting at least a portion of the degassed molten polymer with an inert stripping agent at a pressure equal to or greater than about atmospheric pressure to produce a stripped molten polymer and a spent stripping agent, wherein the inert stripping agent is insoluble in the degassed molten polymer, and wherein the spent stripping agent comprises at least a portion of the inert stripping agent and at least a portion of the VOCs from the degassed molten polymer; and (d) cooling at least a portion of the stripped molten polymer and forming polymer pellets. In some embodiments, the degassed molten polymer can be contacted with a stripping agent in an extruder. In such embodiments, the polymer pellets can be formed as the stripped molten polymer is being discharged from the extruder.

For purposes of the disclosure herein, volatile organic compounds (VOCs) can be any organic compounds that have appreciable or significant vapor pressures at storage or packaging conditions, which are typically atmospheric conditions. Further, for purposes of the disclosure herein, VOCs can be monomers, comonomers, chain transfer agents, peroxide or catalyst decomposition products, diluents, and the like, or combinations thereof.

In an embodiment, a method of removing VOCs from a solid polymer can generally comprise the steps of (a) melting the solid polymer to yield a molten polymer, wherein the molten polymer comprises VOCs; (b) contacting at least a portion of the molten polymer with an inert stripping agent at a pressure equal to or greater than about atmospheric pressure to produce a stripped molten polymer and a spent stripping agent, wherein the inert stripping agent is insoluble in the molten polymer, and wherein the spent stripping agent comprises at least a portion of the inert stripping agent and at least a portion of the VOCs from the molten polymer; and (c) cooling at least a portion of the stripped molten polymer and forming polymer pellets. While the present disclosure will be discussed in detail in the context of a method for removing VOCs from a molten polymer (e.g., a degassed molten polymer), it should be understood that such method or any steps thereof can be applied in any suitable method requiring the removal of VOCs from a polymer. The polymer can comprise any polymer compatible with the disclosed methods and materials.

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs. Further, unless otherwise required by context, singular terms shall include pluralities and plural terms shall include the singular.

Unless explicitly stated otherwise in defined circumstances, all percentages, parts, ratios, and like amounts used herein are defined by weight.

Further, certain features of the present invention which are, for clarity, described herein in the context of separate embodiments, may also be provided in combination in a single embodiment. Conversely, various features of the invention that are, for brevity, described in the context of a single embodiment, may also be provided separately or in any sub-combination.

If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while systems, processes, and methods are often described in terms of "comprising" various components, devices, or steps, the systems, processes, and methods can also "consist essentially of" or "consist of" the various components, devices, or steps, unless stated otherwise.

The term "about" as used herein means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" may mean within 10% of the reported numerical value, preferably within 5% of the reported numerical value.

For purposes of the disclosure herein, an inert stripping agent that is insoluble in a molten polymer refers to an inert stripping agent that doesn't significantly participate in the equilibrium between VOCs and the molten polymer. For example, the concentration of monomer or comonomer in molten polymer that is in equilibrium with the respective concentrations of monomer or comonomer in the inert stripping agent is not strongly dependent on the inert stripping agent or total pressure. Further, for example, the concentration of butene or ethylene in a molten low density polyethylene (LDPE) that is in equilibrium with the respective concentrations of butene or ethylene in an inert stripping agent such as nitrogen is not strongly dependent on the inert stripping agent or total pressure. As will be appreciated by one skilled in the art, and with the help of this disclosure, the concentration of monomer or comonomer (e.g., ethylene or butene) in molten polymer remain dependent largely on the partial pressure of the monomer or comonomer, respectively. However, while independent of the inert stripping agent, the effect of monomer or comonomer (e.g., ethylene or butene) on the equilibrium concentrations do affect one another.

Although any methods, devices, and materials similar or equivalent to those described herein can be used in the practice or testing of the invention, the typical methods, devices, and materials are herein described.

In an embodiment, the polymer (e.g., solid polymer) or the molten polymer can be selected from the group consisting of polyethylene (PE), low density polyethylene (LDPE), linear low density polyethylene (LLDPE), high density polyethylene (HDPE), polystyrene, ethylene vinyl acetate polymer (EVA), ethylene methacrylate polymer (EMA), and ethylene butyl acrylate polymer (EBA).

In an embodiment, a method of removing VOCs from a molten polymer can generally comprise a step of polymerizing monomers in a reactor to produce a reaction mixture comprising unreacted monomers and the molten polymer. In an embodiment, the monomers can comprise ethylene and the molten polymer can comprise polyethylene (PE). The monomers can be polymerized by using any suitable olefin polymerization method which can be carried out using various types of polymerization reactors.

As used herein, the terms "polymerization reactor" or "reactor" include any polymerization reactor capable of polymerizing olefin monomers or comonomers to produce homopolymers or copolymers. Such homopolymers and copolymers are referred to as resins or polymers. The various types of reactors include those that can be referred to as gas phase, batch, slurry, solution, high-pressure, tubular or autoclave reactors. Gas phase reactors can comprise fluidized bed reactors or staged horizontal reactors. Slurry reactors can comprise vertical or horizontal loop reactors. High-pressure reactors can comprise autoclave or tubular reactors. Reactor types can include batch or continuous processes. Continuous processes could use intermittent or continuous product discharge. Processes can also include partial or full direct recycle of unreacted monomer, unreacted comonomer, diluent, or combinations thereof. As will be appreciated by one of skill in the art, and with the help of this disclosure, the reactors considered for this disclosure could be any reactors that are part of a polymerization process that employs a polymerization catalyst system comprising at least one solid component.

Polymerization reactors of the present disclosure can comprise one type of reactor in a system or multiple reactors of the same or different type. Production of polymers in multiple reactors can include several stages in at least two separate polymerization reactors interconnected by transfer stream(s), line(s), apparatus(es) (for example, a separation vessel(s)), device(s) (for example, a valve or other mechanism), or combinations thereof, making it possible to transfer the polymers resulting from a first polymerization reactor into a second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, or a combination of loop and gas phase reactors. The multiple reactors can be operated in series or in parallel.

According to one aspect of this disclosure, the polymerization reactor can comprise at least one gas phase reactor. Such polymerization reactors can employ a continuous recycle stream containing one or more monomers continuously cycled through a fluidized bed in the presence of a catalyst under polymerization conditions. A recycle stream can be withdrawn from the fluidized bed and recycled back into the reactor. Simultaneously, a polymer product can be withdrawn from the reactor and new or fresh monomer can be added to replace the polymerized monomer. Likewise, copolymer product can optionally be withdrawn from the reactor and new or fresh comonomer can be added to replace polymerized comonomer, polymerized monomer, or combinations thereof. Such gas phase reactors can comprise a process for multi-step gas phase polymerization of olefins, in which olefins are polymerized in the gaseous phase in at least two independent gas phase polymerization zones while feeding a catalyst-containing polymer formed in a first polymerization zone to a second polymerization zone. Gas phase reactors are disclosed in U.S. Pat. Nos. 5,352,749; 4,588,790; and 5,436,304; each of which is incorporated by reference herein in its entirety.

In an embodiment, the polymer or copolymer product can be removed from a gas phase reactor in solid form. In such embodiment, the polymer or copolymer product can be subjected to an initial stage wherein a pressure around the solid polymer or copolymer can be reduced and a portion of the VOCs can be removed, thereby producing a degassed solid polymer. A gas (e.g., VOCs, recovered monomer, recovered comonomer) that is withdrawn with the solid polymer (e.g., powder polymer) from the reactor or that is flashed off of the solid polymer can be recycled or fed back to the reactor. Typically, the degassed solid polymer can then be fed to a purge column where the degassed solid polymer can be stripped using an insoluble stripping agent. In some aspects, the methods for removing volatile organic compounds (VOCs) from polymers as disclosed herein could replace the purge column by feeding the degassed solid polymer to equipment (e.g., stripping equipment) that could first melt the polymer and then strip it either in the same equipment or in a successive equipment. In such aspects, the purge equipment and solid polymer transfer equipment between all flash vessels and purge columns can be advantageously eliminated or greatly reduced in size.

According to another aspect of this disclosure, a high-pressure polymerization reactor can comprise a tubular reactor or an autoclave reactor. Tubular reactors, autoclave reactors, or both can have several zones where fresh monomer (optionally, the comonomer), initiators, or a polymerization catalyst system can be added. Monomer (optionally, comonomer) can be entrained in an inert dense fluid stream (well above the critical point at such high pressures) and introduced into the reactor (typically introduced in multiple locations on the reactor). Initiators, and polymerization catalyst system components can be entrained in a monomer feed stream, introduced as liquids or supercritical fluids directly into the reactor, or both. The fluid streams can be intermixed in the reactor to initiate and sustain polymerization. Heat and pressure can be employed appropriately to obtain optimal polymerization reaction conditions. In some embodiments, the polymerization reactor can be a high-pressure autoclave or tubular reactor.

According to yet another aspect of this disclosure, the polymerization reactors can comprise at least one loop slurry reactor comprising vertical or horizontal loops. Monomer, diluent, polymerization catalyst system, and optionally any comonomer can be continuously fed to a loop reactor where polymerization occurs. Generally, continuous processes can comprise the continuous introduction of a monomer, an optional comonomer, a polymerization catalyst system, and a diluent into a polymerization reactor and the continuous removal from this reactor of a suspension comprising polymer particles and the diluent. Reactor effluent can be flashed to remove the solid polymer from the liquids that comprise the diluent, monomer, comonomer, or combinations thereof. Various technologies can be used for this separation step including but not limited to, flashing that can include any combination of heat addition and pressure reduction; separation by cyclonic action in either a cyclone or hydrocyclone; or separation by centrifugation.

A suitable slurry polymerization process (also known as the particle form process), is disclosed, for example, in U.S. Pat. Nos. 3,248,179; 4,501,885; 5,565,175; 5,575,979; 6,239,235; 6,262,191; and 6,833,415; each of which is incorporated by reference herein in its entirety.

In one or more embodiments, suitable diluents used in slurry polymerization include, but are not limited to, the monomer, and optionally, the comonomer, being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to still yet another aspect of this disclosure, the polymerization reactor can comprise a solution polymerization reactor wherein the monomer (optionally, comonomer) can be contacted with a catalyst composition by suitable stirring or other means. A carrier comprising an inert organic diluent or excess monomer (optionally, comonomer) can be employed. If desired, the monomer and/or optional comonomer can be brought in the vapor phase into contact with a catalytic reaction product, in the presence or absence of liquid material. A polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactors suitable for the disclosed systems and processes can further comprise any combination of at least one raw material feed system, at least one feed system for catalyst or catalyst components, and/or at least one polymer recovery system. Suitable polymerization reactors can further comprise systems for feedstock purification, catalyst storage and preparation, extrusion, reactor cooling, polymer recovery, fractionation, recycle, storage, loadout, laboratory analysis, and process control.

In an embodiment, the step of polymerizing monomers in a reactor to produce a reaction mixture can comprise purifying a feed stream or a reagents stream to yield a purified feed stream, and introducing the purified feed stream to the reactor. In one or more of the embodiments disclosed herein, purifying a feed stream can comprise separating unwanted compounds and elements from a feed stream comprising ethylene to form a purified feed stream. In an embodiment, purifying a feed stream can comprise any suitable method or process, including the non-limiting examples of filtering, membrane screening, reacting with various chemicals, absorbing, adsorbing, distillation(s), or combinations thereof.

In some embodiments, a feed stream can comprise ethylene and various other gases, such as but not limited to methane, ethane, acetylene, propane, propylene, water, nitrogen, oxygen, various other gaseous hydrocarbons having three or more carbon atoms, various contaminants, or combinations thereof. Nonlimiting examples of devices that can be used for the purification of one or more reactant gases in a feed stream comprising a plurality of potentially unwanted gaseous compounds, elements, contaminants, and the like include a filter, a membrane, a reactor, an absorbent, a molecular sieve, one or more distillation columns, or combinations thereof.

In an embodiment, the purified feed stream can comprise substantially pure monomers (e.g., substantially pure ethylene). In an embodiment, the purified feed stream can comprise less than about 25% by total weight of the stream, alternatively, less than about 10%, alternatively, less than about 1.0% of any one or more of nitrogen, oxygen, methane, ethane, propane, comonomers, or combinations thereof. As used herein "substantially pure ethylene" refers to a fluid stream comprising at least about 60% ethylene, alternatively, at least about 70% ethylene, alternatively, at least about 80% ethylene, alternatively, at least about 90% ethylene, alternatively, at least about 95% ethylene, alternatively, at least about 99% ethylene by total weight of the stream, or alternatively, at least about 99.5% ethylene by total weight of the stream.

In some embodiments, the purified feed stream can comprise a comonomer, such as unsaturated hydrocarbons having from 3 to 20 carbon atoms. Nonlimiting examples of comonomers that can be present in the purified feed stream include alpha olefins, such as for example propylene, 1-butene, 1-pentene, 1-hexene, 3-methyl-1-butene, 4-methyl-1-pentene, 1-heptene, 1-octene, 1-nonene, 1-decene, and the like, or combinations thereof.

Conditions (e.g., polymerization conditions) that are controlled for polymerization efficiency and to provide resin properties include temperature, pressure, type and/or quantity of initiator, catalyst or co-catalyst, and concentrations and/or partial pressures of various reactants.

Polymerization temperature can affect initiator or catalyst productivity, polymer molecular weight and molecular weight distribution. Suitable polymerization temperature can be any temperature below the de-polymerization temperature according to the Gibbs Free energy equation. In some embodiments, the polymerization temperature can have as upper limit a temperature at which the monomer (e.g., ethylene) begins to decompose. As will be appreciated by one of skill in the art, and with the help of this disclosure, monomer decomposition temperatures are pressure dependent. Polymerization temperatures can be from about 60° C. to about 350° C., alternatively from about 60° C. to about 280° C., or alternatively from about 70° C. to about 110° C., depending upon the type of polymerization reactor.

Suitable pressures will also vary according to the reactor and polymerization type. The pressure for liquid phase polymerizations in a loop reactor is typically less than 1,000 psig (6.9 MPa). Pressure for gas phase polymerization is usually at about 200 psig (1.4 MPa) to about 700 psig (4.8 MPa). High-pressure polymerization in tubular or autoclave reactors is generally run at about 10,000 psig (68.9 MPa) to about 50,000 psig (344.7 MPa). Polymerization reactors can also be operated in a supercritical region occurring at generally higher temperatures and pressures. Operation above the critical point of a pressure/temperature diagram (supercritical phase) can offer advantages. In an embodiment, polymerization can occur in an environment having a suitable combination of temperature and pressure. For example, polymerization can occur at a pressure in a range of from about 550 psig (3.8 MPa) to about 650 psig (4.5 MPa), or alternatively, from about 600 psig (4.1 MPa) to about 625 psig (4.3 MPa) and a temperature in a range of from about 170° F. (77° C.) to about 230° F. (110° C.), or alternatively, from about 195° F. (91° C.) to about 220° F. (104° C.).

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological parameters.

The concentrations and/or partial pressures of monomer, comonomer, hydrogen, co-catalyst, modifiers, and electron donors are important in producing these resin properties. Comonomer can be used to control product density. Hydrogen can be used to control product molecular weight. Cocatalysts can be used to alkylate, scavenge poisons and control molecular weight. Modifiers can be used to control product properties and electron donors affect stereoregularity, the molecular weight distribution, or molecular weight. In addition, the concentration of poisons is minimized because poisons impact the reactions and product properties.

In an embodiment, any suitable catalyst system can be employed. A suitable catalyst system can comprise a catalyst and, optionally, a co-catalyst (e.g., organoaluminum compound), a promoter, or both. In some embodiments the catalyst system can comprise an activator (e.g., activator-support). Nonlimiting examples of suitable catalyst systems include but are not limited to single-site or dual-site catalysts such as Ziegler Natta catalysts, Ziegler catalysts, chromium catalysts, chromium oxide catalysts, chrome-silica catalysts, chrome-titania catalysts, chromocene catalysts, metallocene catalysts, nickel catalysts, or combinations thereof. Suitable metallocene catalysts for use in the systems described herein may be any conventional or non-conventional metallocene catalyst. As used herein, the term "metallocene" is used to refer to all catalytically active metal: η-ligand complexes in which a metal is complexed by one, two, or more open chain or closed-ring η-ligands. The use of bridged bis-η-ligand metallocenes, single η-ligand "half metallocenes", and bridged η-σ ligand "scorpionate" metallocenes is preferred in accordance with some embodiments of the present disclosure. The metal in such complexes is preferably a group 4A, 5A, 6A, 7A or 8A metal or a lanthanide or actinide of the Periodic Table of the Elements, especially a group 4A, 5A or 6A metal, more particularly Zr, Hf or Ti. The η-ligand preferably comprises $\eta^4$ or $\eta^5$ open-chain or a $\eta^5$-cyclopentadienyl ring, optionally with a ring or chain carbon replaced by a heteroatom (e.g. N, B, S or P), optionally substituted by pendant or fused ring substituents and optionally linked by bridge (e.g., a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Catalyst systems suitable for use in the present disclosure have been described, for example, in U.S. Pat. Nos. 7,163,906; 7,619,047; 7,790,820; 7,960,487; 8,138,113; 8,207,280; 8,268,944; 8,450,436; and 9,181,372; each of which is incorporated by reference herein in its entirety.

In an embodiment, any suitable initiator (e.g., an initiator for a free radical polymerization of monomers) can be employed. In an embodiment, the initiator can comprise any suitable free radical initiator. The amount of initiator used in the processes of the present disclosure is dependent upon the desired weight average molecular weight ($M_w$) of the polymer to be produced. Typically, the more initiator that is added, the lower the $M_w$ of the polymer produced. Typically, in accordance with the present disclosure, the initiator is present in amounts ranging from about 0.001 mole percent to about 5 mole percent, based on the moles of monomer. In an embodiment, the free radical initiators can comprise dialkyl peroxides, diacyl peroxides, peroxyesters, peroxyketals, peroxydicarbonates, and the like, or combinations thereof. In some embodiments, the initiator can comprise a living, free-radical polymerization initiator.

Nonlimiting examples of dialkyl peroxides suitable for use in the present disclosure as free radical initiators include di-tertiary butyl peroxide, di-tertiary amyl peroxide, and the like, or combinations thereof.

A nonlimiting example of diacyl peroxides suitable for use in the present disclosure as free radical initiators includes di-3,5,5-trimethyl hexanoyl peroxide (or di-isononanoyl peroxide).

Nonlimiting examples of peroxyesters suitable for use in the present disclosure as free radical initiators include tertiary-butyl peroxyacetate, tertiary-butyl peroxypivalate, tertiary-butyl peroxy-2-ethylhexanoate, tertiary-butyl peroxyneodecanoate, tertiary-butyl peroxyneoheptanoate, tertiary-butyl peroxybenzoate, tertiary-amyl peroxyacetate, tertiary-amyl peroxypivalate, tertiary-amyl peroxy-2-ethylhexanoate, tertiary-amyl peroxyneodecanoate, tertiary-amyl peroxyneoheptanoate, tertiary-amyl peroxybenzoate, and the like, or combinations thereof.

Nonlimiting examples of peroxyketals suitable for use in the present disclosure as free radical initiators include 2,2-di(tertiary-butyl peroxy) butane, 2,2-di(tertiary-amyl peroxy) butane, and the like, or combinations thereof.

Nonlimiting examples of peroxydicarbonates suitable for use in the present disclosure as free radical initiators include diisopropyl peroxydicarbonate, di-n-propyl peroxydicarbonate, di-secondary-butyl peroxydicarbonate, di-n-butyl peroxydicarbonate, bis(2-ethyl-hexyl) peroxydicarbonate, and the like, or combinations thereof.

In one or more of the embodiments disclosed herein, monomers in a feed stream (e.g., a purified feed stream) can be polymerized in a reactor. In one or more embodiments, polymerizing monomers of the purified feed stream can comprise allowing a polymerization reaction between a plurality of monomers by contacting a monomer or monomers with a catalyst system under conditions suitable for the formation of a polymer. In one or more of the embodiments disclosed herein, polymerizing comonomers of a purified feed stream can comprise allowing a polymerization reaction between a plurality of comonomers by contacting a comonomer or comonomers with a catalyst system under conditions suitable for the formation of a copolymer.

In an embodiment, a method of removing VOCs from a molten polymer can comprise a step of removing at least a portion of the reaction mixture from the reactor, wherein the reaction mixture comprises unreacted monomers and the molten polymer. As used herein, an "unreacted monomer," for example, ethylene, refers to a monomer that was introduced into a polymerization reactor during a polymerization reaction but was not incorporated into a polymer.

In some embodiments, the polymerization of ethylene can occur in a gas phase reactor, wherein a gas phase comprises ethylene, and a solid phase comprises polyethylene. In such embodiments, the reaction mixture that is removed from the reactor can comprise solid polyethylene further comprising unreacted ethylene dissolved, entrained, or both, in the solid polyethylene.

In an embodiment, the reaction mixture can further comprise optional unreacted comonomer, mineral spirits, peroxides, diluent, chain transfer agents, propane, hexane, isobutane, hexene, isopentane, pentane, butene, hydrogen, nitrogen, reaction byproducts, and the like, or combinations thereof. As used herein, an "unreacted comonomer" refers to a comonomer that was introduced into a polymerization reactor during a polymerization reaction but was not incorporated into a polymer.

In an embodiment, a method of removing VOCs from a molten polymer can comprise removing a portion of the unreacted monomers from at least a portion of the reaction mixture to produce recovered monomers (e.g., first recovered monomers) and a degassed molten polymer, wherein the degassed molten polymer comprises VOCs. In an embodiment, the VOCs comprise ethylene. As will be appreciated by one of skill in the art, and with the help of this disclosure, the reaction mixture comprises gaseous unreacted monomers (e.g., ethylene) entrained, dissolved, or both, in the molten polymer, and removing ethylene (which is a VOC) from the reaction mixture, molten polymer, or both, will lower the VOC content of the reaction mixture, molten polymer, or both, respectively.

In an embodiment, the reaction mixture can be characterized by an ethylene content of from about 2 wt. % to about 99.9 wt. %, alternatively from about 2 wt. % to about 20 wt. %, alternatively from about 20 wt. % to about 90 wt. %, or alternatively from about 80 wt. % to about 99.9 wt. %, based on the total weight of the reaction mixture. For purposes of the disclosure herein, the ethylene content does not account for polymer concentrations (concentrations of species that have not yet reacted). As will be appreciated by one of skill in the art, and with the help of this disclosure, the amount of each component in the reaction mixture can vary significantly depending on the type of polymerization process being considered.

In one or more embodiments, separating the reaction mixture into recovered monomers and degassed molten polymer can comprise flashing, vaporizing, distilling, filtering, membrane screening, centrifuging, absorbing, adsorbing, or combinations thereof, the reaction mixture. In some embodiments, the reaction mixture can be optionally heated prior to, concurrent with, or both, separating the reaction mixture into recovered monomers and degassed molten polymer.

In an embodiment, a step of removing a portion of the unreacted monomers from at least a portion of the reaction mixture to produce recovered monomers and degassed molten polymer can comprise introducing at least a portion of the reaction mixture to a separator. The separator for separating the reaction mixture into recovered monomers and degassed molten polymer can be configured such that the reaction mixture is flashed by heat, pressure reduction, or both. Nonlimiting examples of separators suitable for use in the present disclosure include a flash chamber, a flash tank, a gravity separator, centrifugal or cyclone separator, a filter, and the like, or combinations thereof.

In an embodiment, the separator can comprise a gravity separator. In one or more of the embodiments disclosed herein, the gravity separator can be configured to separate the reaction mixture into a lower density phase (e.g., unreacted monomer, unreacted ethylene), and a higher density phase (e.g., degassed molten polymer, degassed molten polyethylene). Without wishing to be limited by theory, a separator (e.g., gravity separator) can comprise a vessel configured to separate two phases of differing densities or separate the unreacted ethylene fluid from the molten polymer. The separator for separating the reaction mixture into a liquid comprising the degassed molten polymer and a fluid comprising unreacted monomers can be configured such that a reaction mixture can be separated into a liquid degassed molten polymer and recovered monomers. The higher density phase can be recovered from the gravity separator as a bottoms stream. The lower density phase can comprise volatile solvents; unreacted monomers (e.g., ethylene); unreacted optional comonomers; secondary reaction products (e.g., dimers, trimers, oligomers, initiator by products, catalyst by products), unreacted chain transfer agents, contaminants, and the like; or combinations thereof. The lower density phase can be recovered from the gravity separator as an overhead stream.

In an embodiment, at least a portion of the recovered monomers can be recycled to the step of polymerizing monomers in a reactor to produce a reaction mixture. In an embodiment, the recovered monomers can comprise ethylene, and the VOCs can comprise ethylene. In an embodiment, the recovered monomers can be characterized by an ethylene content of from about 5 wt. % to about 99 wt. %, alternatively from about 20 wt. % to about 98 wt. %, alternatively from about 40 wt. % to about 95 wt. %, based on the total weight of the recovered monomers. As will be appreciated by one of skill in the art, and with the help of this disclosure, the amount of ethylene in the recovered monomers can vary significantly depending on the type of polymerization process being considered. In some embodiments, the recovered monomers can be further purified prior to being recycled to the step of polymerizing monomers in a reactor to produce a reaction mixture by using any suitable methodology, such as for example filtering, membrane screening, reacting with various chemicals, absorbing, adsorbing, distillation(s), or combinations thereof. As will be appreciated by one of skill in the art, and with the help of this disclosure, the recovered monomers can be purified to produce a monomer that is suitable (e.g., pure enough) to be recycled back to the polymerization reactor.

In an embodiment, the degassed molten polymer can be characterized by a degassed molten polymer temperature of from about 250° F. (121° C.) to about 600° F. (316° C.), alternatively from about 250° F. (121° C.) to about 550° F. (288° C.), alternatively from about 275° F. (135° C.) to about 525° F. (274° C.), or alternatively from about 300° F. (149° C.) to about 500° F. (260° C.). In some embodiments, the degassed molten polymer can be heated prior to a step of contacting at least a portion of the degassed molten polymer with an inert stripping agent. As will be appreciated by one of skill in the art, and with the help of this disclosure, a viscosity of the degassed molten polymer can impact the removal of VOCs from the degassed molten polymer, and since the viscosity of the degassed molten polymer is dependent upon the temperature of the degassed molten polymer, the degassed molten polymer temperature can be adjusted to result in a desired degassed molten polymer viscosity that would enable or facilitate the removal of VOCs from the degassed molten polymer.

In an embodiment, the degassed molten polymer can be characterized by a VOC content of from about 100 ppmw to about 10 wt. %, alternatively from about 250 ppmw to about 5 wt. %, or alternatively from about 500 ppmw to about 2,000 ppmw, based on the total weight of the degassed molten polymer. In an embodiment, the VOCs can comprise ethylene. In an embodiment, the VOCs can further comprise hexene, 1-hexene, vinyl acetate, propane, propylene, butane, butylene, acetaldehyde, propionaldehyde, styrene, octene, and the like, or combinations thereof.

In an embodiment, the degassed molten polymer can be characterized by an ethylene content of from about 0.01 wt. % (100 ppmw) to about 10 wt. %, alternatively from about 0.025 wt. % (250 ppmw) to about 5 wt. %, alternatively from about 0.05 wt. % (500 ppmw) to about 0.2 wt. % (2000 ppmw), based on the total weight of the degassed molten polymer.

In an embodiment, a method of removing VOCs from a molten polymer can comprise a step of contacting at least a portion of the degassed molten polymer with an inert stripping agent at a pressure equal to or greater than about atmospheric pressure to produce a stripped molten polymer and a spent stripping agent.

In an embodiment, a step of contacting at least a portion of the degassed molten polymer with an inert stripping agent at a pressure equal to or greater than about atmospheric pressure can comprise forming the degassed molten polymer into a degassed molten polymer film, wherein at least a portion of the degassed molten polymer film can be contacted with an inert stripping agent at a pressure equal to or greater than about atmospheric pressure to produce a stripped molten polymer and a spent stripping agent. In such embodiment, the degassed molten polymer film can comprise a degassed molten polymer thin film, a degassed molten polymer curtain, a degassed molten polymer standing bubble, degassed molten polymer bubbles, and the like, or combinations thereof.

In an embodiment, at least a portion of the degassed molten polymer can be contacted with an inert stripping agent in an extruder, wherein the extruder is part of a pelletization process (e.g., provides polymer in a liquid form that exits the extruder and is formed into pellets); in a film evaporator; in a thin film evaporator; in a falling film device; in a wiped film device; in a flash vessel with sparging inert stripping agent or concurrent inert stripping agent introduction; in a stripping column with countercurrent stripping; and the like; or combinations thereof. While the current disclosure will be discussed in detail in the context of contacting at least a portion of the degassed molten polymer with an inert stripping agent in an extruder, it should be understood that the degassed molten polymer can be contacted with the inert stripping agent by using any suitable methodology and in any suitable device that is compatible with the disclosed methods and materials.

In some embodiments, the inert striping agent can be bubbled through the degassed molten polymer; can foam the degassed molten polymer; or both. As will be appreciated by one of skill in the art, and with the help of this disclosure, when the inert stripping agent bubbles through or foams the degassed molten polymer, a surface contact area between the inert stripping agent and the degassed molten polymer increases and average diffusion lengths necessary for the VOCs to migrate to the surface are reduced, thereby increasing an efficiency of removing VOCs from the degassed molten polymer. Similarly, as will be appreciated by one of skill in the art, and with the help of this disclosure, when the inert stripping agent is contacted with the degassed molten polymer in the form of a polymer film, a surface contact area between the inert stripping agent and the degassed molten polymer increases (and in some instances a thickness of the polymer is reduced such that a diffusion exit pathway is decreased in length), thereby increasing an efficiency of removing VOCs from the degassed molten polymer.

Without wishing to be limited by theory, when a degassed molten polymer is contacted with an inert stripping agent, VOCs that are dissolved, entrained, or both, in the degassed molten polymer will diffuse into the inert stripping agent until an equilibrium concentration of VOCs in the inert stripping agent is established with the remaining VOC content in the polymer, thereby facilitating the removal of the VOCs from the degassed molten polymer by the inert stripping agent. As will be appreciated by one of skill in the art, and with the help of this disclosure, several factors influence the concentration of VOCs in the inert stripping agent, such as equilibria behavior of VOCs and polymer systems (affected by pressure, temperature), surface contact area between the inert stripping agent and the degassed molten polymer, and diffusion rates (affected by diffusion rates and diffusion path lengths), and these factors can be controlled in order to maximize the amount of VOCs removed by the inert stripping agent.

In an embodiment, the inert stripping agent can be insoluble in the degassed molten polymer. In an embodiment, the inert stripping agent can comprise nitrogen, argon, helium, water, water vapor, carbon dioxide ($CO_2$), and the like, or combinations thereof. As will be appreciated by one of skill in the art and with the help of this disclosure, the inert stripping agent does not dissolve to any appreciable degree in the degassed molten polymer or the VOCs entrained, dissolved, or both, in the degassed molten polymer. Further, as will be appreciated by one of skill in the art and with the help of this disclosure, the inert stripping agent does not appreciably affect partial pressure of VOCs above VOCs contained in the molten polymer.

In some embodiments, the inert striping agent can be in a gaseous state, a liquid state, or is a gas-liquid mixture. For example, when the inert stripping agent comprises water vapor (e.g., steam), the inert stripping agent comprises water in both a gaseous state and a liquid state, e.g., a gas-liquid mixture.

In an embodiment, the degassed molten polymer can be contacted with the inert stripping agent at a pressure equal to or greater than about atmospheric pressure, alternatively from about 1 atm (0.101 MPa) to about 20 atm (2.027 MPa), alternatively from about 1 atm (0.101 MPa) to about 15 atm (1.52 MPa), alternatively from about 1 atm (0.101 MPa) to about 10 atm (1.013 MPa), alternatively from about 1 atm (0.101 MPa) to about 5 atm (0.507 MPa), or alternatively from about 1 atm (0.101 MPa) to about 2 atm (0.203 MPa). Atm denotes standard atmospheres (atm) of pressure, wherein the pressure is the pressure relative to complete vacuum. In an embodiment, a method of removing VOCs from a molten polymer can comprise contacting at least a portion of the degassed molten polymer with an inert stripping agent at a positive pressure (e.g., a pressure that is greater than the ambient pressure or atmospheric pressure). In an embodiment, a method of removing VOCs from a molten polymer can further exclude contacting at least a portion of the degassed molten polymer with an inert stripping agent under vacuum.

In an embodiment, the degassed molten polymer can be contacted countercurrent, cocurrent, or both with the inert stripping agent. In some embodiments, the degassed molten polymer can be contacted with the inert stripping agent at any suitable angle. For example, an inert stripping agent can be introduced to a degassed molten polymer film at a perpendicular angle, or any other suitable angle.

In some embodiments, the degassed molten polymer can be further heated during a step of contacting at least a portion of the degassed molten polymer with an inert stripping agent at a pressure equal to or greater than about atmospheric pressure. As will be appreciated by one of skill in the art, and with the help of this disclosure, the degassed molten polymer can have a temperature ranging from about right above the melting temperature of the degassed molten polymer to about the temperature where the degassed molten polymer starts to break down or degrade, and the temperature within this range can be further adjusted by heating the degassed molten polymer, as necessary.

In an embodiment, the degassed molten polymer can be contacted with an inert stripping agent in an extruder. Nonlimiting examples of extruders suitable for use in the present disclosure include single screw extruder, twin screw extruder, and the like, or combinations thereof.

In some embodiments, the inert stripping agent can be introduced to the extruder in a single point (e.g., via a single inlet). In other embodiments, the inert stripping agent can be introduced to the extruder in multiple points (e.g., via multiple inlets). When multiple inlets are used for introducing the stripping agent, all inlets can allow for introducing the same inert stripping agent, or alternatively, different stripping agents can be introduced via different inlets. For example, the extruder can comprise two inlets for the introduction of inert stripping agent, and both inlets could be used for introducing steam or nitrogen to the extruder. As another example, the extruder can comprise two inlets for the introduction of inert stripping agent, and one inlet could be used for introducing steam to the extruder, while the other inlet could be used for introducing nitrogen to the extruder. The extruder can have one, two, three, four, five, six, seven, eight, nine, ten, or more inlets for the stripping agent.

In embodiments where multiple inlets are used for introducing the inert stripping agent to the extruder, the degassed molten polymer can be contacted countercurrent with the inert stripping agent; alternatively the degassed molten polymer can be contacted cocurrent with the inert stripping agent; or the degassed molten polymer can be contacted both countercurrent and cocurrent with the inert stripping agent. For example, the extruder can comprise two inlets for the introduction of inert stripping agent, and one inlet could be used for introducing an inert stripping agent to the extruder countercurrent to the degassed molten polymer, while the other inlet could be used for introducing an inert stripping agent to the extruder cocurrent to the degassed molten polymer.

In an embodiment, the degassed molten polymer can have an average residence time in the extruder of from about 5 seconds (s) to about 5 minutes, alternatively from about 10 s to about 60 s, or alternatively from about 15 s to about 30 s. Generally, the average residence time in an extruder refers to the average amount of time that a compound (e.g., a molecule of that compound) spends in that particular extruder.

In some embodiments, the extruder can be further heated by external heating, jacket heating, electrical heating, internal heating, imparting mechanical shear, and the like, or combinations thereof.

In an embodiment, a method of removing VOCs from a solid polymer can comprise the step of melting the solid polymer to yield a molten polymer, wherein the molten polymer comprises VOCs. In such embodiment, the solid polymer can be produced by a particle form process (e.g., gas phase process, slurry process), as previously disclosed herein. The solid polymer can be a powder, polymer fluff, pellet, and the like, or combinations thereof. In embodiments where a solid polymer is melted to yield the molten polymer (as opposed to recovering a degassed molten polymer from the reactor), the molten polymer can be subjected to the same steps as the degassed molten polymer recovered from the polymerization reactor (e.g., contacting the molten polymer with an inert stripping agent, recovering a stripped molten polymer, forming polymer pellets).

In an embodiment, the solid polymer subjected to a method of removing VOCs from a solid polymer can be any suitable solid polymer (e.g., any solid polymer produced by any polymerization method). In an embodiment, the solid polymer can be a degassed solid polymer produced by a particle form process (e.g., gas phase process, slurry process), as previously disclosed herein, wherein the degassed solid polymer requires further stripping. The degassed solid polymer can generally be obtained by removal of VOCs from the solid polymer coming out the reactor, for example in a flash tank. Conventional methods of further stripping the degassed solid polymer generally employ a purge column. The method of removing VOCs from a solid polymer as disclosed herein could melt the degassed solid polymers into molten polymers and strip them in the same equipment, allowing for removal of the purge columns or making them much smaller. The degassed solid polymer could be melted through heating and/or shear and contacted with inert stripping agents simultaneously or in subsequent steps, but in the same equipment.

In some embodiments, the step of melting the solid polymer and the step of contacting at least a portion of the molten polymer with an inert stripping agent at a pressure equal to or greater than about atmospheric pressure can occur in the same equipment. In such embodiments, the equipment can comprise an extruder.

In other embodiments, the step of melting the solid polymer and the step of contacting at least a portion of the molten polymer with an inert stripping agent at a pressure equal to or greater than about atmospheric pressure can occur in different equipment.

In an embodiment, a method of removing VOCs from a molten polymer can comprise recovering a spent stripping agent, wherein the spent stripping agent can comprises at least a portion of the inert stripping agent and at least a portion of the VOCs from the degassed molten polymer. In some embodiments, the spent stripping agent can be flared.

In embodiments wherein the stripping agent comprises water (e.g., water vapor, steam) and wherein the VOCs comprise hydrocarbons (e.g., ethylene), at least a portion of the hydrocarbons can be recovered from the spent stripping agent by condensing at least a portion of the water from the spent stripping agent to yield recovered hydrocarbons. As will be appreciated by one of skill in the art, and with the help of this disclosure, condensed water (e.g., liquid water) can be easily removed to allow for recovering gaseous hydrocarbons. In an embodiment, the recovered hydrocarbons comprise recovered ethylene, wherein at least a portion of the recovered ethylene is purified (if necessary) and recycled to a step (a) of polymerizing monomers in a reactor to produce a reaction mixture.

In an embodiment, at least a portion of the VOCs can be recovered from the spent stripping agent to yield recovered VOC. In some embodiments, at least a portion of the recovered VOCs can be recycled as monomers to the step of polymerizing monomers in a reactor to produce a reaction mixture.

In an embodiment, the recovered VOCs can comprise ethylene. In an embodiment, the recovered VOCs can be characterized by an ethylene content of from about 0.1 wt. % to about 99.9 wt. %, alternatively from about 1 wt. % to about 95 wt. %, alternatively from about 10 wt. % to about 90 wt. %, based on the total weight of the recovered VOCs. As will be appreciated by one of skill in the art, and with the help of this disclosure, the amount of ethylene in the recovered VOCs can vary significantly depending on the type of polymerization process being considered. In an embodiment, the recovered VOCs can further comprise hexene, 1-hexene, vinyl acetate, propane, propylene, butane, butylene, acetaldehyde, propionaldehyde, styrene, octene, and the like, or combinations thereof. In some embodiments, the recovered VOCs can be further purified prior to being recycled to the step of polymerizing monomers in a reactor to produce a reaction mixture by using any suitable methodology, such as for example filtering, membrane screening, reacting with various chemicals, absorbing, adsorbing, distillation(s), or combinations thereof. As will be appreciated by one of skill in the art, and with the help of this disclosure, the recovered VOCs can be purified to produce a monomer that is suitable (e.g., pure enough) to be recycled back to the polymerization reactor.

In an embodiment, a method of removing VOCs from a molten polymer can comprise recovering a stripped molten polymer. In an embodiment, the stripped molten polymer can be characterized by a VOC content of from about 1 ppmw to about 500 ppmw, alternatively from about 10 ppmw to about 400 ppmw, alternatively from about 20 ppmw to about 300 ppmw, alternatively from about 30 ppmw to about 200 ppmw, alternatively from about 50 ppmw to about 100 ppmw, alternatively less than about 100 ppmw, alternatively less than about 50 ppmw, alternatively less than about 40 ppmw, alternatively less than about 30 ppmw, alternatively less than about 20 ppmw, alternatively less than about 10 ppmw, based on the total weight of the stripped molten polymer.

In an embodiment, a method of removing VOCs from a molten polymer can comprise a step of cooling at least a portion of the stripped molten polymer and forming polymer pellets. In some embodiments, the step of cooling at least a portion of the stripped molten polymer and forming polymer pellets can occur in the same equipment as the step of contacting at least a portion of the degassed molten polymer with an inert stripping agent at a pressure equal to or greater than about atmospheric pressure. In such embodiments, the equipment can comprise an extruder. For example, the stripped molten polymer can be extruded into strands, which strands can be passed through a water bath to cool down and then can be sized (e.g., chopped) into pellets or any other desired geometry.

In some embodiments, the step of cooling the stripped molten polymer and forming polymer pellets can occur about concurrent with preparing at least a portion of the polymer pellets for storage, transport, or both. Often, polymer pellets with a VOC content of greater than about 50 ppmw have to be further subjected to VOC removal, which is commonly done by placing the polymer pellets in large silos and running an inert gas or air over them.

In some embodiments, the polymer pellets can be characterized by a VOC content of less than about 50 ppmw, alternatively less than about 40 ppmw, alternatively less than about 30 ppmw, alternatively less than about 20 ppmw, alternatively less than about 10 ppmw, based on the total weight of the polymer pellets. In such embodiments, a method of removing VOCs from a molten polymer can further exclude contacting the polymer pellets with an inert gas to remove VOCs from the polymer pellets. As will be appreciated by one of skill in the art, and with the help of this disclosure, the VOC content of the polymer pellets is about the same as the VOC content of the stripped molten polymer.

In an embodiment, a method of removing VOCs from a molten polymer can further comprise contacting at least a portion of the polymer pellets with an inert gas or air to remove at least a portion of the VOCs from the polymer pellets. As will be appreciated by one of skill in the art, and with the help of this disclosure, the polymer pellets can be contacted with an inert gas for any suitable time frame that allows for enough VOCs to be removed from the polymer pellets such that the polymer pellets have a VOC content of less than about 50 ppmw, based on the total weight of the polymer pellets. In an embodiment, the inert gas can comprise nitrogen, argon, helium, carbon dioxide ($CO_2$), air, and the like, or combinations thereof.

In an embodiment, the polymer pellets can be contacted with an inert gas for a time period of from about 30 minutes to about 360 minutes, alternatively from about 45 minutes to about 60 minutes, or alternatively from about 60 minutes to about 120 minutes, to yield polymer pellets having a VOC content of less than about 50 ppmw, based on the total weight of the polymer pellets. In an embodiment, polymer pellets produced by an otherwise similar method lacking a step of contacting the degassed molten polymer with an inert stripping agent at a pressure equal to or greater than about atmospheric pressure can be contacted with an inert gas for a time period of from about 4 hours to about 48 hours, alternatively from about 6 hours to about 24 hours, or alternatively from about 7 hours to about 10 hours, to yield polymer pellets having a VOC content of less than about 50 ppmw, based on the total weight of the polymer pellets.

In an embodiment, the polymer pellets can be contacted with an inert gas characterized by an inert gas flow rate, wherein a flow rate of the inert gas can be from about 40% to about 99%, alternatively from about 45% to about 98%, or alternatively from about 50% to about 95% lower than a flow rate of an inert gas contacted with polymer pellets produced by an otherwise similar method lacking a step of contacting the degassed molten polymer with an inert stripping agent at a pressure equal to or greater than about atmospheric pressure. As will be appreciated by one of skill in the art, and with the help of this disclosure, the polymer pellets can be contacted with an inert gas characterized by any suitable flow rate that allows for enough VOCs to be removed from the polymer pellets such that the polymer pellets have a VOC content of less than about 50 ppmw, based on the total weight of the polymer pellets.

In an embodiment, the polymer pellets can be further packaged, transported, or both, for distribution and sale, wherein the polymer pellets can have a VOC content of less than about 50 ppmw. In an embodiment, the method of removing VOCs from a molten polymer can produce a polymer product (e.g., polymer pellets) that can be suitable for commercial or industrial usage, storage, transportation, further processing, or combinations thereof.

In an embodiment, the polymer pellets can be further processed by routing the polymer pellets to a polymer processor. The polymer processor can be configured for the performance of a suitable processing means (e.g., to form various articles), nonlimiting examples of which include cooling, injection molding, melting, pelletizing, film blowing, cast film, blow molding, extrusion molding, rotational molding, thermoforming, cast molding, fiber spinning, and the like, or combinations thereof. Various additives and modifiers can be added to the polymer pellets to provide better processing during manufacturing and for desired properties in the end product. Nonlimiting examples of such additives can include surface modifiers such as slip agents, antiblocks, tackifiers; antioxidants such as primary and secondary antioxidants; pigments; processing aids such as waxes/oils and fluoroelastomers; and/or special additives such as fire retardants, antistats, scavengers, absorbers, odor enhancers, and degradation agents.

The polymer pellets can include other suitable additives. Such additives can be used singularly or in combination and can be included in the polymer before, during or after preparation of the polymer pellets as described herein. Such additives can be added via known techniques, for example during an extrusion or compounding step such as during pelletization or subsequent processing into an end use article.

In an embodiment, the polymer processor can be configured to form a suitable polymer product. Nonlimiting examples of suitable polymer products that can result from processing the polymer pellets include films, powders, pellets, resins, liquids, or any other suitable form as will be appreciated by those of skill in the art. Such a suitable form can be for use in, for example, one or more of various consumer or industrial products. For example, the polymer product can be utilized in any one or more of various articles, including, but not limited to, bottles, drums, toys, containers, household containers, utensils, film products, tanks, fuel tanks, pipes, membranes, geomembranes, and liners.

In an embodiment, a method of removing VOCs from a molten polymer can comprise (a) polymerizing ethylene in a high-pressure autoclave or tubular reactor to produce a reaction mixture comprising unreacted ethylene and a molten LDPE; (b) removing a portion of the unreacted ethylene from at least a portion of the reaction mixture via gravity separation induced by a pressure reduction to produce first recovered ethylene and a degassed molten LDPE, wherein the degassed molten LDPE comprises ethylene in an amount of from about 500 ppmw to about 2,000 ppmw, based on the total weight of the degassed molten LDPE, wherein the degassed molten LDPE is characterized by a degassed molten LDPE temperature of from about 200° C. to about 350° C., wherein the degassed molten LDPE is characterized by a degassed molten LDPE Melt Index (MI) of from about 0.1 dg/min to about 500 dg/min, wherein MI is an LDPE melt index under a force of 2.16 kg as determined in accordance with ASTM D1238-13 or ISO 1133-2012, and wherein at least a portion of the first recovered ethylene is recycled to step (a) of polymerizing ethylene; (c) contacting at least a portion of the degassed molten LDPE with steam in an extruder at a pressure of from about 1 atm (0.101 MPa) to about 2 atm (0.203 MPa) to produce a stripped molten LDPE and spent steam, wherein the spent steam comprises at least a portion of the steam and at least a portion of the ethylene from the degassed molten LDPE, and wherein the stripped molten LDPE is characterized by an ethylene content of from about 1 ppmw to about 100 ppmw, based on the total weight of the stripped molten LDPE; (d) cooling at least a portion of the stripped molten LDPE exiting the extruder and forming LDPE pellets; (e) wherein at least a portion of ethylene is recovered from the spent steam by condensing at least a portion of the water from the spent steam to yield second recovered ethylene, and wherein at least a portion of the second recovered ethylene is purified (e.g., dehumidified, dehydrated) as necessary and recycled to step (a) of polymerizing ethylene; and (f) optionally contacting at least a portion of the LDPE pellets with nitrogen characterized by a nitrogen flow rate, wherein a flow rate of the nitrogen is from about 50% to about 99% lower than a flow rate of an inert gas contacted with LDPE pellets produced by an otherwise similar method lacking a step of contacting the degassed molten LDPE with steam at a pressure of from about 1 atm (0.101 MPa) to about 2 atm (0.203 MPa). In such embodiment, the stripped molten LDPE can be characterized by an ethylene content of less than about 30 ppmw, based on the total weight of the stripped molten LDPE.

In an embodiment, a method of removing VOCs from a solid polymer can comprise (a) polymerizing ethylene in a loop slurry reactor to yield a reaction product slurry comprising solid PE (e.g., PE fluff); (b) recovering the reaction product slurry from the loop slurry reactor; (c) applying heat to the reaction product slurry; (d) flashing the reaction product slurry at a lower pressure to produce a first recycled stream and a degassed solid PE, (e) melting the degassed solid PE to yield a degassed molten PE, wherein the degassed molten PE comprises ethylene; (f) contacting at least a portion of the degassed molten PE with steam a pressure of from about 1 atm (0.101 MPa) to about 2 atm (0.203 MPa) to produce a stripped molten PE and spent steam, wherein the spent steam comprises at least a portion of the steam and at least a portion of the ethylene from the degassed molten PE; and (g) cooling at least a portion of the stripped molten PE and forming PE pellets, wherein the PE pellets can be characterized by an ethylene content of less than about 50 ppmw, based on the total weight of the PE pellets.

In an embodiment, a method of removing VOCs from a solid polymer can comprise (a) polymerizing ethylene in a gas phase reactor to yield a reaction product comprising solid PE (e.g., PE fluff); (b) recovering the reaction product from the gas phase reactor; (c) applying heat to the reaction product; (d) flashing the reaction product at a lower pressure to produce a first recycled stream and a degassed solid PE, (e) melting the degassed solid PE to yield a degassed molten PE, wherein the degassed molten PE comprises ethylene; (f) contacting at least a portion of the degassed molten PE with steam a pressure of from about 1 atm (0.101 MPa) to about 2 atm (0.203 MPa) to produce a stripped molten PE and spent steam, wherein the spent steam comprises at least a portion of the steam and at least a portion of the ethylene from the degassed molten PE; and (g) cooling at least a portion of the stripped molten PE and forming PE pellets, wherein the PE pellets can be characterized by an ethylene content of less than about 50 ppmw, based on the total weight of the PE pellets.

In an embodiment, a method of removing VOCs from a polymer as disclosed herein can advantageously display improvements in one or more method characteristics when compared to an otherwise similar method lacking a step of contacting the molten polymer (e.g., degassed molten polymer) with an inert stripping agent at a pressure equal to or greater than about atmospheric pressure. Vacuum removal of VOCs from molten polymers can introduce certain risks, especially in industrial settings, by allowing air intrusion in the degassing atmosphere via vacuum seals, thereby presenting the risk of forming an explosive atmosphere in the presence of hydrocarbons recovered from polymers. An air atmosphere can also be detrimental to the properties of the final polymer. Vacuum removal of VOCs is also a more energy intensive process when compared to operating at ambient or slightly above ambient pressure. In an embodiment, a method of removing VOCs from a polymer as disclosed herein can advantageously reduce or eliminate the probability of experiencing silo or packaging fires in polymer plants (e.g., LDPE plants).

In an embodiment, removing VOCs from a molten polymer at ambient pressure can advantageously display a smoother operation when compared to vacuum removal of VOCs from a molten polymer, as sucking air in and out to create a vacuum can lead to variations in process parameters, thereby introducing more variation in a level of residual hydrocarbons that do not get removed from the molten polymer during VOC removal.

In an embodiment, a method of removing VOCs from a polymer as disclosed herein can advantageously produce polymer pellets that require reduced or no purging with an inert gas in a silo. In an embodiment, a method of removing VOCs from a polymer as disclosed herein can advantageously reduce the need for silo space in polymer plants (e.g., LDPE plants). In an embodiment, a method of removing VOCs from a polymer as disclosed herein can advantageously reduce or eliminate a need for purge air blowers in finishing areas of polymer plants (e.g., LDPE plants). In an embodiment, the polymer pellets may be packaged (e.g., placed in sacks, bins, totes, railcars, barges, or combinations thereof) about immediately following stripping to remove VOCs as described herein—that is without the need for additional residence time such as providing additional purge capability in storage silos to provide further purge gas contact and final polishing/VOC removal.

In an embodiment, a method of removing VOCs from a polymer as disclosed herein can advantageously allow for recovery of monomer from the polymer, wherein the recovered monomer can be recycled to a polymerization reactor.

In an embodiment, a method of removing VOCs from a polymer as disclosed herein can advantageously allow for elimination of large purge vessels and stripping gas systems in gas phase and slurry plants used for polymer production (e.g., PE production). As will be appreciated by one of skill in the art, and with the help of this disclosure, diffusion rates, desorption rates, or both, of VOCs are about an order of magnitude higher when polymer is melted rather than when polymer is solid.

In another embodiment, a method of removing VOCs from a polymer as disclosed herein can advantageously allow for size reduction of large purge vessels and stripping gas systems in gas phase and slurry plants used for polymer production (e.g., PE production), as well as combining such vessels and systems with an extrusion operation. As will be appreciated by one of skill in the art, and with the help of this disclosure, degassing is much quicker in molten state, allowing for reduced purging times or reduced purging equipment (e.g., vessels, or stripping gas compressors). Additional advantages of the methods of removing VOCs from a polymer as disclosed herein can be apparent to one of skill in the art viewing this disclosure.

ADDITIONAL DISCLOSURE

The following enumerated embodiments are provided as non-limiting examples.

A first embodiment which is a method of removing volatile organic compounds (VOCs) from a molten polymer comprising:

(a) polymerizing monomers in a reactor to produce a reaction mixture comprising unreacted monomers and the molten polymer;

(b) removing a portion of the unreacted monomers from at least a portion of the reaction mixture to produce recovered monomers and a degassed molten polymer, wherein the degassed molten polymer comprises VOCs;

(c) contacting at least a portion of the degassed molten polymer with an inert stripping agent at a pressure equal to or greater than about atmospheric pressure to produce a stripped molten polymer and a spent stripping agent, wherein the inert stripping agent is insoluble in the degassed molten polymer, and wherein the spent stripping agent comprises at least a portion of the inert stripping agent and at least a portion of the VOCs from the degassed molten polymer; and (d) cooling at least a portion of the stripped molten polymer and forming polymer pellets.

A second embodiment which is the method of the first embodiment, wherein the degassed molten polymer is characterized by a degassed molten polymer temperature of from about 250° F. (121° C.) to about 600° F. (316° C.).

A third embodiment which is the method of any one of the first through the second embodiments, wherein the degassed molten polymer is characterized by a VOC content of from about 100 ppmw to about 10 wt. %, based on the total weight of the degassed molten polymer.

A fourth embodiment which is the method of any one of the first through the third embodiments, wherein the stripped molten polymer is characterized by a VOC content of from about 1 ppmw to about 500 ppmw, based on the total weight of the stripped molten polymer.

A fifth embodiment which is the method of any one of the first through the fourth embodiments, wherein step (d) of cooling the stripped molten polymer and forming polymer pellets occurs about concurrent with preparing at least a portion of the polymer pellets for storage, transport, or both.

A sixth embodiment which is the method of any one of the first through the fifth embodiments further comprising contacting at least a portion of the polymer pellets with an inert gas or air characterized by an inert gas or air flow rate, wherein a flow rate of the inert gas or air is from about 40% to about 99% lower than a flow rate of an inert gas or air contacted with polymer pellets produced by an otherwise similar method lacking a step of contacting the degassed molten polymer with an inert stripping agent at a pressure equal to or greater than about atmospheric pressure.

A seventh embodiment which is the method of any one of the first through the sixth embodiments further comprising contacting at least a portion of the polymer pellets with an inert gas for a time period of from about 60 mins to about 120 minutes, wherein a time period of contacting an inert gas with polymer pellets produced by an otherwise similar method lacking a step of contacting the degassed molten polymer with an inert stripping agent at a pressure equal to or greater than about atmospheric pressure is from about 7 hours to about 10 hours.

An eighth embodiment which is the method of any one of the first through the seventh embodiments, wherein at least a portion of the degassed molten polymer is contacted with the inert stripping agent in an extruder, wherein the extruder forms the polymer pellets; in a film evaporator; in a thin film evaporator; in a falling film device; in a wiped film device; in a flash vessel with sparging inert stripping agent or concurrent inert stripping agent introduction; in a stripping column with countercurrent stripping; or combinations thereof.

A ninth embodiment which is the method of the eighth embodiment, wherein the degassed molten polymer has an average residence time in the extruder of from about 15 s to about 30 s.

A tenth embodiment which is the method of any one of the eighth through the ninth embodiments, wherein the extruder is further heated by external heating, jacket heating, electrical heating, internal heating, imparting mechanical shear, or combinations thereof.

An eleventh embodiment which is the method of any one of the first through the tenth embodiments, wherein the molten polymer is selected from the group consisting of polyethylene (PE), low density polyethylene (LDPE), linear low density polyethylene (LLDPE), high density polyethylene (HDPE), polystyrene, ethylene vinyl acetate polymer (EVA), ethylene methacrylate polymer (EMA), and ethylene butyl acrylate polymer (EBA).

A twelfth embodiment which is the method of any one of the first through the eleventh embodiments, wherein the reactor comprises a high-pressure autoclave reactor and wherein the molten polymer comprises low density polyethylene (LDPE).

A thirteenth embodiment which is the method of any one of the first through the twelfth embodiments, wherein the degassed molten polymer is contacted countercurrent, cocurrent, or both with the inert stripping agent.

A fourteenth embodiment which is the method of any one of the first through the thirteenth embodiments, wherein at least a portion of the recovered monomers is recycled to a step (a) of polymerizing monomers in a reactor to produce a reaction mixture.

A fifteenth embodiment which is the method of any one of the first through the fourteenth embodiments, wherein the recovered monomers comprise ethylene, and wherein the VOCs comprise ethylene.

A sixteenth embodiment which is the method of the fifteenth embodiment, wherein the VOCs further comprise hexene, 1-hexene, vinyl acetate, propane, propylene, butane, butylene, acetaldehyde, propionaldehyde, styrene, octene, or combinations thereof.

A seventeenth embodiment which is the method of any one of the first through the sixteenth embodiments, wherein at least a portion of the VOCs is recovered from the spent stripping agent to yield recovered VOC.

An eighteenth embodiment which is the method of the seventeenth embodiment, wherein at least a portion of the recovered VOCs is recycled as monomers to a step (a) of polymerizing monomers in a reactor to produce a reaction mixture.

A nineteenth embodiment which is the method of the first through the eighteenth embodiments, wherein the VOCs comprise hydrocarbons, wherein the inert stripping agent comprises water, wherein at least a portion of the hydrocarbons is recovered from the spent stripping agent by condensing at least a portion of the water from the spent stripping agent to yield recovered hydrocarbons.

A twentieth embodiment which is the method of the nineteenth embodiment, wherein the recovered hydrocarbons comprise recovered ethylene, and wherein at least a portion of the recovered ethylene is recycled to a step (a) of polymerizing monomers in a reactor to produce a reaction mixture.

A twenty-first embodiment which is the method of any one of the first through the twentieth embodiments, wherein the spent stripping agent is flared.

A twenty-second embodiment which is the method of any one of the first through the twenty-first embodiments, wherein the inert stripping agent comprises nitrogen, argon, helium, water, water vapor, carbon dioxide ($CO_2$), or combinations thereof.

A twenty-third embodiment which is the method of any one of the first through the twenty-second embodiments further excluding contacting at least a portion of the degassed molten polymer with an inert stripping agent under vacuum.

A twenty-fourth embodiment which is the method of the first embodiment, wherein step (c) of contacting at least a portion of the degassed molten polymer with an inert stripping agent comprises forming the degassed molten polymer into a degassed molten polymer film, wherein at least a portion of the degassed molten polymer film is contacted with an inert stripping agent at a pressure equal to or greater than about atmospheric pressure to produce a stripped molten polymer and a spent stripping agent.

A twenty-fifth embodiment which is the method of the twenty-fourth embodiment, wherein the degassed molten polymer film comprises a degassed molten polymer thin film, a degassed molten polymer curtain, a degassed molten polymer standing bubble, degassed molten polymer bubbles, or combinations thereof.

A twenty-sixth embodiment which is the method of any one of the first through the twenty-fifth embodiments, wherein the inert striping agent is in a gaseous state, a liquid state, or is a gas-liquid mixture.

A twenty-seventh embodiment which is the method of any one of the first through twenty-sixth embodiments, wherein the inert striping agent is bubbled through the degassed molten polymer; foams the degassed molten polymer; or both.

A twenty-eighth embodiment which is the method of any one of the first through the twenty-seventh embodiments, wherein the stripped molten polymer is characterized by a VOC content of less than about 30 ppmw, based on the total weight of the stripped molten polymer.

A twenty-ninth embodiment which is the method of any one of the first through the twenty-eighth embodiments further comprising contacting at least a portion of the polymer pellets with an inert gas for a time period of from about 30 mins to about 360 minutes, wherein a time period of contacting an inert gas with polymer pellets produced by an otherwise similar method lacking a step of contacting the degassed molten polymer with an inert stripping agent at a pressure equal to or greater than about atmospheric pressure is from about 4 hours to about 48 hours.

A thirtieth embodiment which is the method of the eighth embodiment, wherein the degassed molten polymer has an average residence time in the extruder of from about 5 s to about 5 minutes.

A thirty-first embodiment which is a method of removing volatile organic compounds (VOCs) from a molten polymer comprising:

(a) polymerizing ethylene in a high-pressure autoclave or tubular reactor to produce a reaction mixture comprising unreacted ethylene and a molten low density polyethylene (LDPE);

(b) removing a portion of the unreacted ethylene from at least a portion of the reaction mixture to produce first recovered ethylene and a degassed molten LDPE, wherein the degassed molten LDPE comprises VOCs in an amount of from about 500 ppmw to about 2,000 ppmw, based on the total weight of the degassed molten LDPE, wherein the degassed molten LDPE is characterized by a degassed molten LDPE temperature of from about 240° C. to about 350° C., wherein the degassed molten LDPE is characterized by a degassed molten LDPE Melt Index (MI) of from about 0.1 dg/min to about 500 dg/min, wherein MI is an LDPE melt index under a force of 2.16 kg as determined in accordance with ASTM D1238-13 or ISO 1133-2012, and wherein at least a portion of the first recovered ethylene is recycled to step (a) of polymerizing ethylene;

(c) contacting at least a portion of the degassed molten LDPE with an inert stripping agent in an extruder at a pressure of from about 1 atm (0.101 MPa) to about 2 atm (0.203 MPa) to produce a stripped molten LDPE and a spent stripping agent, wherein the spent stripping agent comprises at least a portion of the inert stripping agent and at least a portion of the VOCs from the degassed molten LDPE, and wherein the stripped molten LDPE is characterized by a VOC content of from about 1 ppmw to about 100 ppmw, based on the total weight of the stripped molten LDPE;

(d) cooling at least a portion of the stripped molten LDPE exiting the extruder and forming LDPE pellets; and (e) optionally contacting at least a portion of the LDPE pellets with an inert gas characterized by an inert gas flow rate, wherein a flow rate of the inert gas is from about 50% to about 99% lower than a flow rate of an inert gas contacted with LDPE pellets produced by an otherwise similar method lacking a step of contacting the degassed molten LDPE with an inert stripping agent at a pressure of from about 1 atm (0.101 MPa) to about 2 atm (0.203 MPa).

A thirty-second embodiment which is the method of the thirty-first embodiment, wherein the portion of the unreacted ethylene is removed from the at least a portion of the reaction mixture via gravity separation induced by a pressure reduction.

A thirty-third embodiment which is the method of any one of the thirty-first through the thirty-second embodiments, wherein the stripped molten LDPE is characterized by a VOC content of less than about 30 ppmw, based on the total weight of the stripped molten LDPE.

A thirty-fourth embodiment which is the method of the thirty-third embodiment further excluding contacting the LDPE pellets with an inert gas to remove VOCs from the LDPE pellets.

A thirty-fifth embodiment which is the method of any one of the thirty-first through the thirty-fourth embodiments, wherein the stripping agent comprises water or steam, wherein the VOCs comprise ethylene, wherein at least a portion of ethylene is recovered from the spent stripping agent by condensing at least a portion of the water from the spent stripping agent to yield second recovered ethylene, and wherein at least a portion of the second recovered ethylene is recycled to step (a) of polymerizing ethylene.

A thirty-sixth embodiment which is a method of removing volatile organic compounds (VOCs) from a solid polymer comprising:

(a) melting the solid polymer to yield a molten polymer, wherein the molten polymer comprises VOCs;

(b) contacting at least a portion of the molten polymer with an inert stripping agent at a pressure equal to or greater than about atmospheric pressure to produce a stripped molten polymer and a spent stripping agent, wherein the inert stripping agent is insoluble in the molten polymer, and wherein the spent stripping agent comprises at least a portion of the inert stripping agent and at least a portion of the VOCs from the molten polymer; and (c) cooling at least a portion of the stripped molten polymer and forming polymer pellets.

A thirty-seventh embodiment which is the method of the thirty-sixth embodiment, wherein a step (a) of melting the solid polymer and a step (b) of contacting at least a portion of the molten polymer with an inert stripping agent at a pressure equal to or greater than about atmospheric pressure occur in the same equipment.

A thirty-eighth embodiment which is the method of the thirty-seventh embodiment, wherein the equipment comprises an extruder.

A thirty-ninth embodiment which is the method of the thirty-sixth embodiment, wherein a step (a) of melting the solid polymer and a step (b) of contacting at least a portion of the molten polymer with an inert stripping agent at a pressure equal to or greater than about atmospheric pressure occur in different equipment.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, and the like; greater than 0.10 includes 0.11, 0.12, 0.13, 0.14, and the like). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention.

What is claimed is:

1. A method of removing volatile organic compounds (VOCs) from a molten polymer comprising:

(a) polymerizing monomers in a reactor to produce a reaction mixture comprising unreacted monomers and the molten polymer;

(b) removing a portion of the unreacted monomers from at least a portion of the reaction mixture to produce recovered monomers and a degassed molten polymer, wherein the degassed molten polymer comprises VOCs;

(c) contacting at least a portion of the degassed molten polymer with an inert stripping agent at a pressure equal to or greater than about atmospheric pressure to produce a stripped molten polymer and a spent stripping agent, wherein the inert stripping agent is insoluble in the degassed molten polymer, and wherein the spent stripping agent comprises at least a portion of the inert stripping agent and at least a portion of the VOCs from the degassed molten polymer; and (d) cooling at least a portion of the stripped molten polymer and forming polymer pellets.

2. The method of claim 1, wherein the degassed molten polymer is characterized by a degassed molten polymer temperature of from about 250° F. to about 600° F.

3. The method of claim 1, wherein the degassed molten polymer is characterized by a VOC content of from about 100 ppmw to about 10 wt. %, based on the total weight of the degassed molten polymer.

4. The method of claim 1, wherein the stripped molten polymer is characterized by a VOC content of from about 1 ppmw to about 500 ppmw, based on the total weight of the stripped molten polymer.

5. The method of claim 1, wherein step (d) of cooling the stripped molten polymer and forming polymer pellets occurs about concurrent with preparing at least a portion of the polymer pellets for storage, transport, or both.

6. The method of claim 1 further comprising contacting at least a portion of the polymer pellets with an inert gas or air characterized by an inert gas or air flow rate, wherein a flow rate of the inert gas or air is from about 40% to about 99% lower than a flow rate of an inert gas or air contacted with polymer pellets produced by an otherwise similar method lacking a step of contacting the degassed molten polymer with an inert stripping agent at a pressure equal to or greater than about atmospheric pressure.

7. The method of claim 1 further comprising contacting at least a portion of the polymer pellets with an inert gas for a time period of from about 30 mins to about 360 minutes, wherein a time period of contacting an inert gas with polymer pellets produced by an otherwise similar method lacking a step of contacting the degassed molten polymer with an inert stripping agent at a pressure equal to or greater than about atmospheric pressure is from about 4 hours to about 48 hours.

8. The method of claim 1, wherein at least a portion of the degassed molten polymer is contacted with the inert stripping agent in an extruder, wherein the extruder forms the polymer pellets; in a film evaporator; in a thin film evaporator; in a falling film device; in a wiped film device; in a flash vessel with sparging inert stripping agent or concurrent inert stripping agent introduction; in a stripping column with countercurrent stripping; or combinations thereof.

9. The method of claim 1, wherein the molten polymer is selected from the group consisting of polyethylene (PE), low density polyethylene (LDPE), linear low density polyethylene (LLDPE), high density polyethylene (HDPE), polystyrene, ethylene vinyl acetate polymer (EVA), ethylene methacrylate polymer (EMA), and ethylene butyl acrylate polymer (EBA).

10. The method of claim 1, wherein the degassed molten polymer is contacted countercurrent, cocurrent, or both with the inert stripping agent.

11. The method of claim 1, wherein at least a portion of the recovered monomers is recycled to a step (a) of polymerizing monomers in a reactor to produce a reaction mixture.

12. The method of claim 1, wherein the recovered monomers comprise ethylene, and wherein the VOCs comprise ethylene.

13. The method of claim 12, wherein the VOCs further comprise hexene, 1-hexene, vinyl acetate, propane, propylene, butane, butylene, acetaldehyde, propionaldehyde, styrene, octene, or combinations thereof.

14. The method of claim 1, wherein the VOCs comprise hydrocarbons, wherein the inert stripping agent comprises water, wherein at least a portion of the hydrocarbons is recovered from the spent stripping agent by condensing at least a portion of the water from the spent stripping agent to yield recovered hydrocarbons.

15. The method of claim 14, wherein the recovered hydrocarbons comprise recovered ethylene, and wherein at least a portion of the recovered ethylene is recycled to a step (a) of polymerizing monomers in a reactor to produce a reaction mixture.

16. The method of claim 1, wherein the inert stripping agent comprises nitrogen, argon, helium, water, water vapor, carbon dioxide ($CO_2$), or combinations thereof.

17. The method of claim 1 further excluding contacting at least a portion of the degassed molten polymer with an inert stripping agent under vacuum.

18. A method of removing volatile organic compounds (VOCs) from a molten polymer comprising:

(a) polymerizing ethylene in a high-pressure autoclave or tubular reactor to produce a reaction mixture comprising unreacted ethylene and a molten low density polyethylene (LDPE);

(b) removing a portion of the unreacted ethylene from at least a portion of the reaction mixture to produce first recovered ethylene and a degassed molten LDPE, wherein the degassed molten LDPE comprises VOCs in an amount of from about 500 ppmw to about 2,000 ppmw, based on the total weight of the degassed molten LDPE, wherein the degassed molten LDPE is characterized by a degassed molten LDPE temperature of from about 240° C. to about 350° C., wherein the degassed molten LDPE is characterized by a degassed molten LDPE Melt Index (MI) of from about 0.1 dg/min to about 500 dg/min, and wherein at least a portion of the first recovered ethylene is recycled to step (a) of polymerizing ethylene;

(c) contacting at least a portion of the degassed molten LDPE with an inert stripping agent in an extruder at a pressure of from about 1 atm to about 2 atm to produce a stripped molten LDPE and a spent stripping agent, wherein the spent stripping agent comprises at least a portion of the inert stripping agent and at least a portion of the VOCs from the degassed molten LDPE, and wherein the stripped molten LDPE is characterized by a VOC content of from about 1 ppmw to about 100 ppmw, based on the total weight of the stripped molten LDPE;

(d) cooling at least a portion of the stripped molten LDPE exiting the extruder and forming LDPE pellets; and (e) optionally contacting at least a portion of the LDPE pellets with an inert gas characterized by an inert gas flow rate, wherein a flow rate of the inert gas is from about 50% to about 99% lower than a flow rate of an inert gas contacted with LDPE pellets produced by an otherwise similar method lacking a step of contacting the degassed molten LDPE with an inert stripping agent at a pressure of from about 1 atm to about 2 atm.

19. The method of claim 18, wherein the stripped molten LDPE is characterized by a VOC content of less than about 30 ppmw, based on the total weight of the stripped molten LDPE.

20. A method of removing volatile organic compounds (VOCs) from a solid polymer comprising:
   (a) melting the solid polymer to yield a molten polymer, wherein the molten polymer comprises VOCs;
   (b) contacting at least a portion of the molten polymer with an inert stripping agent at a pressure equal to or greater than about atmospheric pressure to produce a stripped molten polymer and a spent stripping agent, wherein the inert stripping agent is insoluble in the molten polymer, and wherein the spent stripping agent comprises at least a portion of the inert stripping agent and at least a portion of the VOCs from the molten polymer; and
   (c) cooling at least a portion of the stripped molten polymer and forming polymer pellets.

21. The method of claim 20, wherein a step (a) of melting the solid polymer and a step (b) of contacting at least a portion of the molten polymer with an inert stripping agent at a pressure equal to or greater than about atmospheric pressure occur in the same equipment, wherein the equipment comprises an extruder.

* * * * *